US006604636B2

(12) United States Patent
Sallen et al.

(10) Patent No.: US 6,604,636 B2
(45) Date of Patent: Aug. 12, 2003

(54) DOCUMENT COUNTER

(75) Inventors: Jaime Rosello Sallen, Binefar (ES); Bryan James Christophersen, Fareham (GB); John Alan Skinner, Hampshire (GB); Simon George Calverley, Hampshire (GB)

(73) Assignee: De la Rue International Limited, Hampshire (GB)

( * ) Notice: Subject to any disclaimer, the term of this patent is extended or adjusted under 35 U.S.C. 154(b) by 54 days.

(21) Appl. No.: 09/781,958

(22) Filed: Feb. 14, 2001

(65) Prior Publication Data

US 2001/0048069 A1 Dec. 6, 2001

(30) Foreign Application Priority Data

Feb. 17, 2000 (GB) .......................................... 0003720

(51) Int. Cl.[7] .............................. B07C 5/00; G06K 7/00

(52) U.S. Cl. ....................... 209/534; 209/577; 209/900; 194/207; 250/556

(58) Field of Search ................................ 209/534, 576, 209/577, 587, 900; 194/206, 207; 250/556

(56) References Cited

U.S. PATENT DOCUMENTS 4,922,109 A * 5/1990 Bercovitz et al. ........... 250/556
5,242,041 A * 9/1993 Isobe ......................... 194/207
6,223,876 B1 * 5/2001 Walsh et al. ................ 194/207

FOREIGN PATENT DOCUMENTS

JP 2-150983 * 6/1990 ................. 194/207
JP 6-203243 * 7/1994 ................. 194/207

* cited by examiner

*Primary Examiner*—Tuan N. Nguyen
(74) *Attorney, Agent, or Firm*—Oliff & Berridge, PLC

(57) ABSTRACT

A method of processing documents of value. The method including detecting a visible pattern on at least one side of a document; detecting the response of at least one side of the document to infrared radiation; comparing the detected visible pattern to one or more predetermined patterns and identifying the document if the detected visible pattern is sufficiently similar to the or one of the predetermined patterns; and determining from the response to infrared radiation if the document is authentic.

13 Claims, 2 Drawing Sheets

DOCUMENT COUNTER

FIELD OF THE INVENTION

The invention relates to methods and apparatus for processing documents of value such as banknotes, cheques, postal orders and the like.

DESCRIPTION OF THE PRIOR ART

The need for rapid counting of paper sheets, for example documents of value such as banknotes, has been long established and the introduction of the single pocket note counter provided major improvements in efficiency. These products were however somewhat limited as they could only count the number of pieces of paper that were conveyed through the machine regardless of their value or authenticity.

Over the course of time further developments added size detection as a means of detecting rogue notes within a bundle of currency and indeed the further application of the size measurements allowed a determination of the value of the currency to be obtained. Providing of course that each denomination was of a discernibly different size. The processing by value of currency whose notes were all the same size, for example the US Dollar, was achieved by the step of using a pattern detector instead of a size detector.

Similarly, the development of authentication devices allowed potential counterfeit notes to be identified during the note processing operation. Because of the need for these devices to be generic to all currencies only the simplest forms of authentication, such as UV fluorescence, were originally applied. Later currency specific devices for widely circulated currencies such as the US Dollar were developed. This latter authentication was almost invariably some form of magnetics detection. Detecting magnetic features is limiting, as the note needs to form intimate contact with the sensing head, which places arduous demands on the transporting of the banknotes. This can be particularly limiting when processing limp or damaged currency.

The problem with the addition of this increased sophistication was that invariably the achievable note throughput would fall. This was because each time a problem note was identified the product would have to stop to allow the operator to examine ad process the identified note. This was overcome by the introduction of counting devices that had more than one pocket and could therefore operate in a continuous manner (like a note sorter) whereby the problem note could be off sorted to either a second pocket or a reject area. The operator could now process the problem notes without the machine needing to stop thus greatly enhancing the efficiency of the product. Similar problems have been experienced in equipment for accepting cash deposits where there has become a requirement for more rapid accurate recognition and authentication of deposited documents as the time to process the acceptance or otherwise of inserted individual or bundles of documents is reduced.

As stated earlier the types of authentication applied to such products have been chosen to be of a generic type applicable to most currencies or specifically targeted at the US Dollar. Detection techniques such as UV are now often regarded as of little benefit against the types of forgeries that are being created.

SUMMARY OF THE INVENTION

In accordance with one aspect of the present invention, a method of processing documents of value comprises:

a) detecting a visible pattern on at least one side of a document;

b) detecting the response of at least one side of the document to infrared radiation;

c) comparing the detected visible pattern to one or more predetermined patterns and identifying the document if the detected visible pattern is sufficiently similar to the or one of the predetermined patterns; and, d) determining from the response to infrared radiation it the document is authentic.

In accordance with another aspect of the present invention, apparatus for processing documents of value comprises a visible pattern detection system for detecting a visible pattern on at least one side of a document; an infrared response detection system including at least one infrared detector and infrared emitter for detecting the response of at least one side of a document to infrared radiation; and a processor for comparing the detected visible pattern to one or more predetermined patterns so as to identify the document if the detected visible pattern is sufficiently similar to the or one of the predetermined patterns, and for determining from the response to infrared radiation it the document is authentic.

The invention enables a new form of non-contact detection to be introduced into the banknote counting product environment that provides enhanced authentication processing that was previously only found in the much higher cost banknote sorting arena. The non-contact nature of the detector providing the advantage that note guiding constraints are minimised and the range of notes that can be processed is maximised.

Commonly available equipment such as PC's with scanners and inkjet printers are now capable of creating visual images that are difficult to discern as being a counterfeit and matching the UV characteristics of a banknote is easily achieved. However, it is known that the inks used to create these images do nor result in any form of image being visible when the note is illuminated and viewed in the IR spectrum. Real bank notes may be printed with inks that are known to produce a controlled response in the IR spectrum, albeit the response produced under IR light does not necessarily bear any relation to that in the visible domain. Indeed some banknotes are produced with inks, such as the De La Rue Delacode type, that are colour matched in the visible spectrum but that respond differently in the IR. A note can thus be printed with a continuous colour block in the visible and a varying intensity level in the IR.

Processing such notes is best carried out in both the visible and IR spectra with the IR response being examined separately for each side of the note. The visible image is checked to ensure that it conforms to the visual aspects of the note and the IR spectra is checked for its authenticity. The IR response should be particularly checked in areas that are known to be printed with the colour matched types of ink.

In one application, the method is used in a two pocket value balancing counter that is capable of providing a variety of functions inclusive of continuous note processing whilst simultaneously determining the value and authenticity of each note. A transmissive visible pattern detector determines the value of the note. The product is considerably enhanced by the addition of an IR detector that can operate in conjunction with the pattern detector.

BRIEF DESCRIPTION OF THE DRAWINGS

An example of a method and apparatus according to the present invention will now be described with reference to the accompanying drawing, in which.

DESCRIPTION OF THE EMBODIMENT

Figure 2:
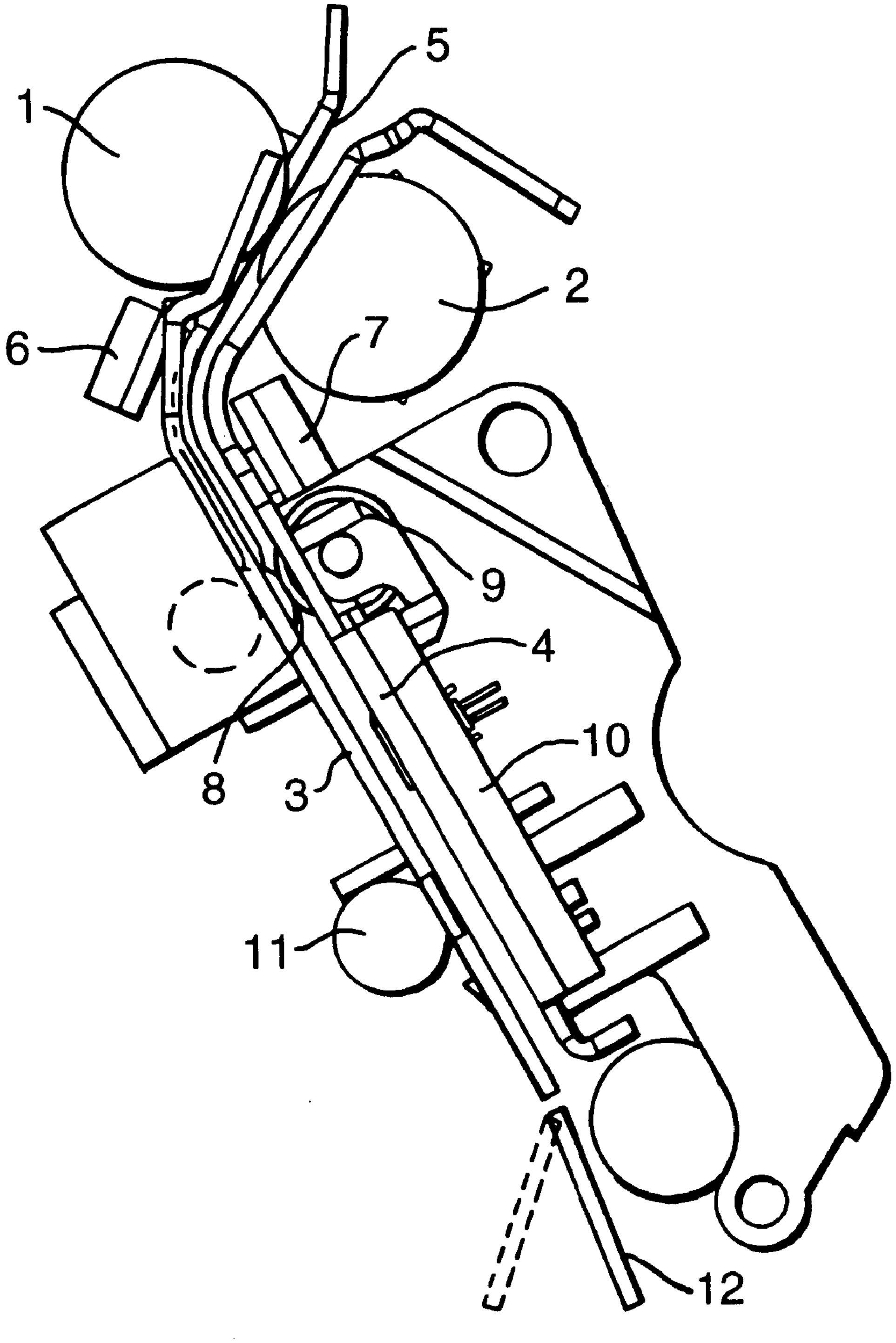

The system comprises a pair of upper pinch rollers 1,2 (FIG. 2) into which banknotes are fed from an input; hopper (not shown). The notes are guided by a pair of opposed guide plates 3,4 along a note path 5.

From the upper pinch rollers 1,2, the notes are guided past first and second infrared detector assemblies 6,7 located on opposite sides of the path to detect reflected infrared radiation. The notes then pass between a pair of middle pinch rollers 8,9 to a visible response detection system 10 where the notes are irradiated under visible light and the resultant reflected signal is obtained so as to determine the visible pattern of the facing surface of the note, The notes pass on between lower pinch rollers 11 (only one visible in FIG. 2) to a diverter 12.

Each IR detector assembly 6,7 includes an infrared emitter and an infrared detector for detecting infrared light reflected from the facing surface of the note.

In order to avoid interference the detectors must not look directly at each other. The detector assemblies 6,7 are mounted on the back of the guide plates 3,4 with the sensing elements sitting in slots in the plates such that the fronts of the sensors are 0.5 mm sub-flush to the front of the plates. Keeping the detectors sub-flush minimises the risk of a note catching on a detector head.

The guide plates 3,4 are finished in matt black or similar IR black finish to provide a reference or background surface for the opposite IR detector sensors.

A control PCB 20 for the detectors is mounted on the side of the machine under the main covers (not shown). The IR detector assemblies are connected to the control PCS 20 (FIG. 1) that includes signal processing, storage for the expected responses and a microprocessor to perform the appropriate data analysing steps.

Figure 1:
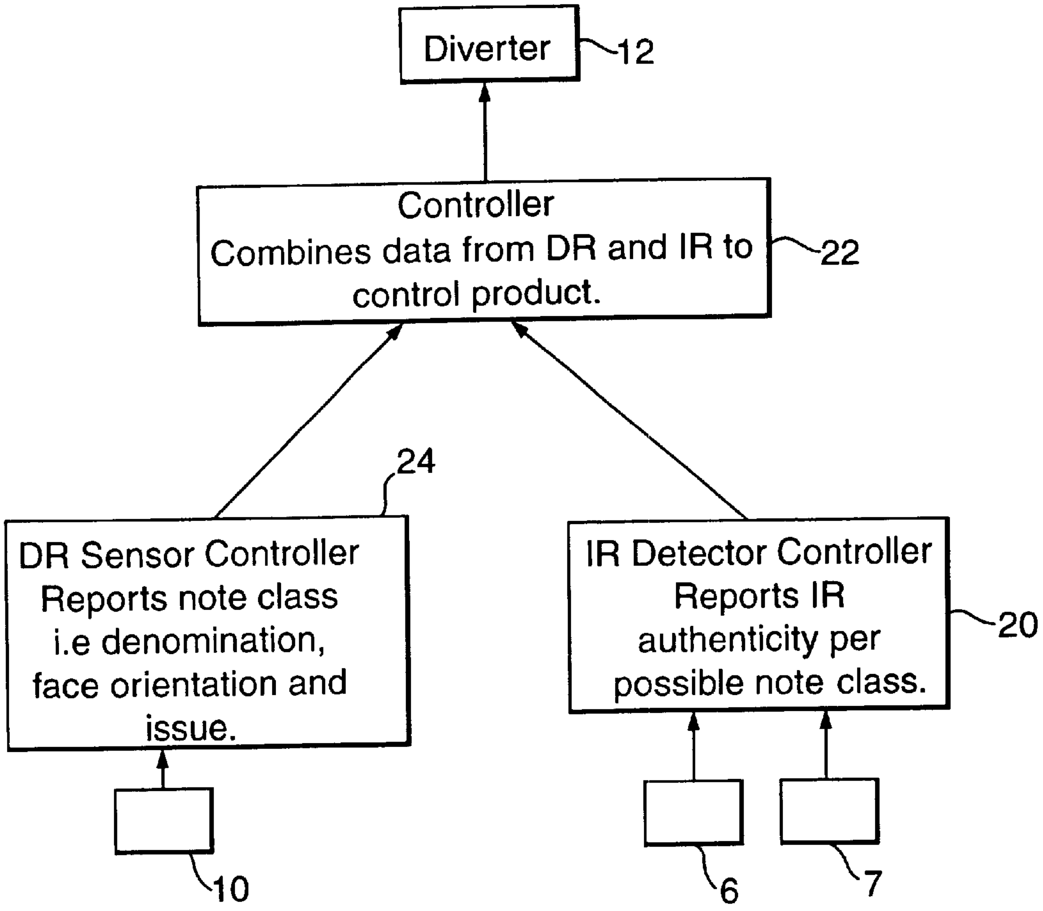
FIG. 1 is a block diagram of the main components of a banknote denomination and authenticity detection system; and, FIG. 2 illustrates part of a note transport.

FIG. 1 shows the relationship between a Main Controller 22 of the counter, the IR detector controller 20 and a DR sensor (pattern detector) controller 24 connected to the visible response detection system 10.

The DR sensor controller 24 examines each note as it arrives and by comparison to a set of templates determines the denomination, face and orientation of the note. This comparison can be carried out using any known pattern recognition technique. This is reported via an RS232 link to the Main controller 22. The IR detector controller 20 also examines each note against a set of IR expected responses and reports to the Main controller 22 a confidence level of validity for each sensed note for each note type within the set of notes expected. This comparison could simply check that the received intensity of reflected i.r. lies in a predetermined range or that i.r, with an acceptable intensity is reflected from certain parts of the note. This table of data is then reported via the RS232 link to the Main Controller. The Main controller 22 then combines this data by using the information from the pattern detector controller 24 to select the appropriate data from the responses given by the IR detector. For example the DR sensor report may have indicated that the note had a denomination of 5, was face up and of issue 2. The IR detector report for this note could be that the IR response was valid on the basis of these two results the note would be accepted, however, if the note was not recognisable or it the IR response for that particular note was reported as low confidence, the note would be rejected.

The advantage of this form of processing is that the computationally intensive image processing in the detectors is carried out in parallel. This means the processing load within the machine is balanced and does not "bottleneck" on one or the other of the detectors. The aggregation of the results in the Main Controller however, still ensures that the verification of the inter-relationship of the IR signal and visible image is fully checked. Serial processing is also envisaged.

Each infrared detector assembly 6,7 is composed of an external and an internal linear array each of 32 sensors, with the detector of each detector assembly reading a different face of the note. The product has two arrays reading the two different faces of the note, giving a two-sided IR test of the note.

Each infrared array is composed of a single-lens auto-focused transmission/detection unit with a focal length of 4 mm. In this module we have an NIR transmitter and a receiver sensitive to 840 nm, with resin insulation to block the direct infrareds as they are emitted. We also have a focal length of 4 mm for each of these components, with signal variation from the collector being less than 20% against 0–4 mm variation in the reading distance. The emission from the transmitter is constant and the receiver is constantly active with a multiplexer system responsible for reading each pixel. This multiplexer system is integral to the internal array, while for the external set it is located on the external array control PCB.

The detector arrays are composed of independent photo-detection units with them all continuously emitting and reading the reflected signal. These units or array pixels have a 2.5 mm focal length effecting a line reading every 2 mm. By means of a multiplexer system we know at any moment the reflected level in each one of these pixels and with the bank of data so obtained we have a grey-scale reconstruction of the image obtained due to the fact that the position of said pixels never varies.

The infrared detector as composed of an array of independent elements, but their optical response might at first vary. This can be compensated for, that is to say the array is grey-scale calibrated to retrieve the same response as before the reflection. This calibration is retained in the detection PCB and every time a reading is taken, the sensors are digitally corrected by the hardware.

We continue to obtain the reflected values with digital compensation per photodiode with every 2 mm the note advances as identified by the motor's encoder.

As soon as the note reaches the array (whether external or internal glass) each one of the photo-diodes continues to detect presence, due to the increase in reflected light. Bear in mind that there is a base black or reflection level and that this level rises when a note passes. This level is always lower than the maximum absorption obtained with the body of the note.

These analogue values obtained by reading line are converted into a value of grey, and with the group of readings obtained as the note passes through, we have a two-dimensional grey scale response.

The reflected level or IR from the IR black finish on the guide plate is lower than that reflected from the passing document. This ensures that the authentication data received is that of the document.

A study is then made by areas of the note with reference to the different contrasts obtained on both faces of the note, so obtaining the necessary information to determine the authenticity of the note.

The processing of currency is initiated by placing the notes into a tray (not shown). Depending on the operating mode selected by the operator, the notes are either sensed by an auto start sensor and the note feed process automatically starts, or the operator operates a switch to start the feed process. The notes are then counted by an opacity based doubles detect sensor (not shown) that checks both the short edge length and opacity of the note. From here the notes then pass over each of the IR sensors 6,7 and the DR sensor 10 where the note images are acquired for processing. A transport encoder (not shown) tracks the movement of the note and the results of the note processing must be available before it reaches the "decision point" within the transport. The decision point is that point in the process at which a decision must be made about activating a diverter mechanism within the document transport path to route the note away from the path. In the example of a two-pocket sorter, to either the top 10 or bottom 12 stacker tray.

If the product is being used in a "single pocket mode" (value balancing, rogue outsort etc.) then all good notes are routed to a bottom tray and all suspect and rejected notes are routed to a top tray by the diverter 12. Under these circumstances the product will provide continuous operation for the processing of the entire bundle of notes. Notes accumulating in the top tray can be processed by the operator whilst the remaining notes with the bundle are being counted.

If the product is being used for a two-pocket operation (issue split, facing etc.) then when a problem note is identified then it is automatically routed to the top tray regardless of the other aspects of the note and the transport is stopped. After the transport has stopped, all the notes in the top tray need removing for re-processing and the problem note needs to be separated for appropriate checks or repair.

Throughout all operations, error messages and count/value information is shown in the LCD display.

We claim:

1. Apparatus for processing documents of value, the apparatus comprising a visible pattern detection system for detecting a visible pattern on at least one side of a document;

an infrared response detection system including at least one infrared detector and infrared emitter for detecting the response of at least one side of a document to infrared radiation; and a processor for comparing the detected visible pattern to one or more predetermined patterns so as to identify the document if the detected visible pattern is sufficiently similar to the or one of the predetermined patterns, and for determining from the response to infrared radiation if the document is authentic.

2. Apparatus according to claim 1, wherein the infrared response detection system comprises two sets of infrared emitters and detectors arranged on opposite sides of the transport path so as to monitor infrared radiation reflected by opposite sides of the documents.

3. Apparatus according to claim 2, wherein the two sets of infrared emitters and detectors are offset from one another in the transport direction.

4. Apparatus according to claim 1, wherein the or each infrared emitter is arranged opposite an IR black reference surface.

5. Apparatus according to claim 1, if further comprising a transport system for transporting documents past the visible and infrared detection systems, the transport system including a diverter operable by the processor to divert documents to one of a number of output locations in accordance with the at least one of determined identity and authenticity.

6. A method of processing documents of value, the method comprising:

a) detecting a visible pattern on at least one side of a document;

b) detecting the response of at least one side of the document to infrared radiation;

a) comparing the detected visible pattern to one or more predetermined patterns and identifying the document if the detected visible pattern is sufficiently similar to the or one of the predetermined patterns; and, d) determining from the response to infrared radiation if the document is authentic.

7. A method according to claim 6, wherein steps a) and b) are carried out on the same side of the document.

8. A method according to claim 6, wherein step d) comprises determining if the infrared radiation reflected from the document satisfies predetermined conditions.

9. A method according to any claim 6, wherein step b) comprises determining the response of one or more regions of the at least one side of the document to infrared radiation.

10. A method according to claim 6, wherein if a document cannot be at least one of identified and authenticated, the document is either routed to one of a number of locations or is held stationary.

11. A method according to claim 6, wherein the documents comprise banknotes.

12. A method according to claim 8, wherein the predetermined conditions which must be satisfied for authentication of the document include the received intensity of reflected infrared radiation being within a predetermined range of intensity.

13. A method according to claim 8, wherein the predetermined conditions which must be satisfied for authentication of the document include the received intensity of reflected infrared radiation from certain parts of the document being of an acceptable level.

* * * * *